Oct. 31, 1933.                H. LEHMANN                1,932,470
            OPTICAL TELESCOPE FOR MEDICAL AND TECHNICAL PURPOSES
                            Filed Jan. 28, 1932
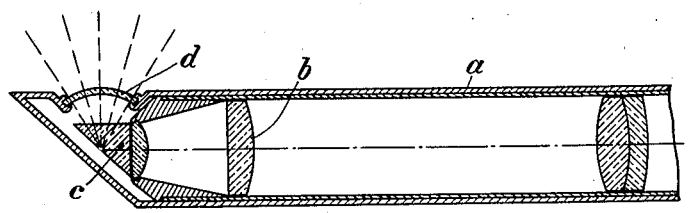
Inventor:
Herbert Lehmann
By Riddle Margeson and Hormidge
Attorneys.

Patented Oct. 31, 1933

1,932,470

UNITED STATES PATENT OFFICE 1,932,470

OPTICAL TELESCOPE FOR MEDICAL AND TECHNICAL PURPOSES

Herbert Lehmann, Leipsig-Engelsdorf, Germany

Application January 28, 1932, Serial No. 589,343, and in Germany January 28, 1931

1 Claim. (Cl. 88—33)

This invention relates to an optical telescope for medical and technical purposes. This telescope is intended chiefly for observing in liquids from the outer side.

The instruments of this type hitherto generally used are open to the objection, that the picture angle of these instruments, when they are used in the water or in other liquids in considerably smaller (about 2/3) than when using the instrument in the air.

The invention avoids this objection in that the admission element of the optical system is made like a watch glass and so arranged that the centre of the spherical admission surface coincides with the admission pupil of the system and the rays entering are not refracted at all in passing into the optical system.

An embodiment of the invention is illustrated in longitudinal section in the only figure of the accompanying drawing.

The illustration shows the lens end of a telescope $a$, in which a cystoscope lens system $b$ is mounted having a roof-shaped prism $c$ cemented thereon. The closing plate, which was hitherto usually plano or plano-convex, consists according to the invention of a watch glass like plate $d$ with such radii, that the picture angle remains unchanged, no matter whether the instrument is used in the air or in more strong reflecting media.

Instead of the prism cemented on the lens as illustrated, a prism fixed in some other manner, or in certain instances a mirror, can be employed.

I claim:—

An optical telescope for medical and technical purposes, comprising in combination a system having a cemented on prism on the object side, a cover plate of watch glass like shape so arranged that the centre of the spherical admission surface of said cover plate coincides with the admission pupil of the system.

HERBERT LEHMANN.